Nov. 25, 1924.
A. F. CIBS ET AL
ELECTRIC TOASTER
Filed Dec. 19, 1923
1,517,149
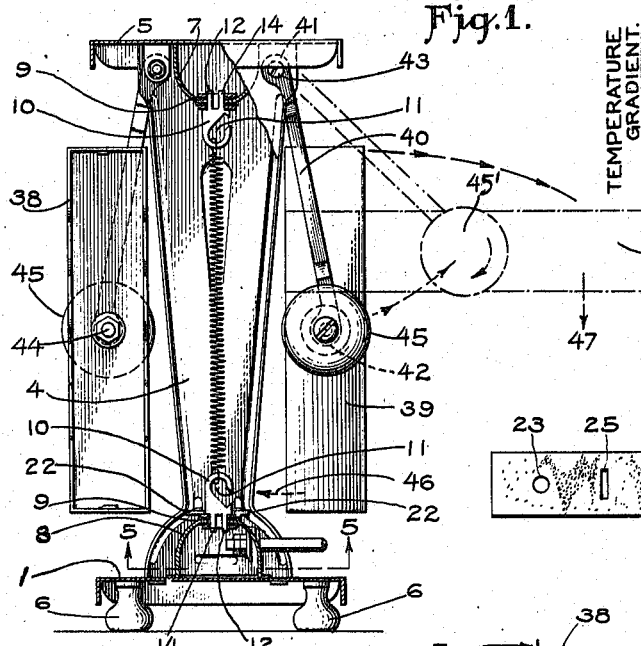
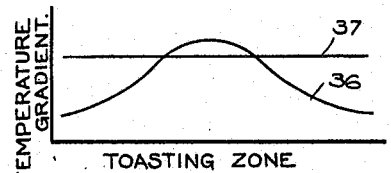
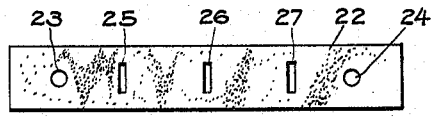
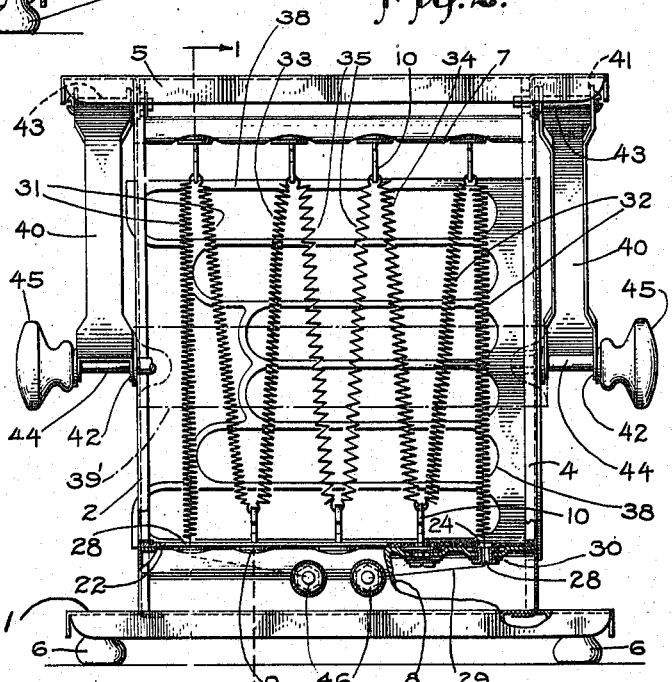
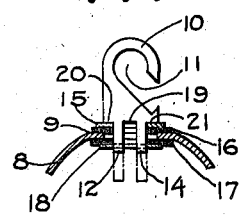
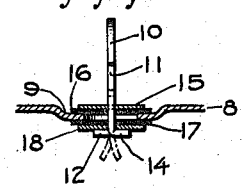
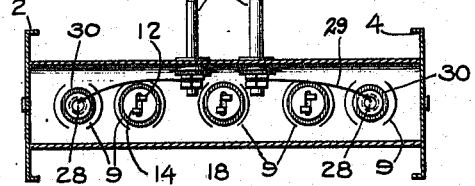
Inventors
Anthony F. Cibs
& Robert P. Simmons.
By John B. Brady
Attorney Patented Nov. 25, 1924.

1,517,149

UNITED STATES PATENT OFFICE.

ANTHONY F. CIBS AND ROBERT P. SIMMONS, OF CLEVELAND, OHIO; SAID CIBS ASSIGNOR TO SAID SIMMONS.

ELECTRIC TOASTER.

Application filed December 19, 1923. Serial No. 681,599.

*To all whom it may concern:*

Be it known that we, ANTHONY F. CIBS and ROBERT P. SIMMONS, citizens of the United States, residing at Cleveland, in the county of Cuyahoga and State of Ohio, have invented certain new and useful Improvements in an Electric Toaster, of which the following is a specification.

Our invention relates broadly to electric heaters, and more particularly to a construction of electric bread toaster.

One of the objects of our invention is to provide a simplified construction of electric toaster capable of inexpensive manufacture in quantity production.

Another object of our invention is to provide a simplified form of mounting for bread racks adjacent the heating element in an electric toaster whereby both sides of the bread may be evenly heated and easily turned to secure uniform toasting of the bread.

Another object of our invention is to provide a mechanical construction for turnover doors on a toaster in which gravity action may be largely employed in quickly turning the bread in the process of toasting.

A further object of our invention is to provide a simple and inexpensive method of mounting and anchoring the heating element within the toaster frame.

Still another object of our invention is to provide an arrangement of the heating element wherein the heat to which the bread is subjected during the toasting process is uniformly distributed throughout the area of the bread.

Still another object of our invenion is to provide means adjacent the heating element for forcing the heat in an upward direction and reducing conduction and radiation of heat downwardly or in a direction away from the bread where it is not usefully employed but wasted.

Other and further objects of our invention will be understood from the specification hereinafter following by reference to the accompanying drawings, in which:

Figure 1 is an end view of our electric toaster construction partially broken away to illustrate the means we employ for anchoring the resistance element in the toaster and insuring the passage of heat in an upward direction; Fig. 2 is a side elevation of the electric toaster construction partially broken away to illustrate the anchoring means which support the heating element; Figs. 3 and 4 are detailed views of the heating element anchor posts employed in our construction; Fig. 5 is a plan view looking at the underside of the means which anchor the heating element; Fig. 6 is a plan view illustrating the means we employ for directing the heat in an upward direction and preventing its passage downwardly; and Fig. 7 is a theoretical diagram showing the uniform distribution of heat over the area of the bread obtained in our toaster construction.

Heretofore in the art electric toasters have been relatively complicated in construction and expensive in manufacture and assembly. Our present construction of electric toaster is extremely simple and the method of mounting the bread racks is such that only a single pivotal connection is provided between the toaster frame and the bread rack. The arrangement of the toaster racks on either side of the heating element of the electric toaster is such that the racks may be moved outwardly a short distance from the toaster frame simultaneously with rotative movement of the toaster rack. When the rotative movement has reached a given angle, the force of gravity becomes effective to complete the turnover of the toast, enabling the toaster rack to be returned quickly to a position adjacent the heating element.

In our construction we utilize punch pressed sheet material, inherently reducing manufacturing costs. Anchor posts are employed for supporting the heating element in the toaster frame, the posts being stamped from sheet metal with teeth formed on one end of the posts and arranged to cooperate with slotted metallic members insulated from the supporting frame whereby the anchor post is firmly secured in the heating element supporting frame but substantially electrically insulated therefrom.

We also provide a heat insulating plate which is placed over the anchor posts and forms a heat reflecting surface at the lower portion of the toaster operating to force the heat upwardly and preventing it from passing downwardly and wasting away on the toaster frame or adjacent surfaces. We also arrange the heating element to uniformly distribute heat over the area of the bread to be toasted and compensate for the radiation of heat from points adjacent the ends of the toaster. In previous constructions of toasters there has been a tendency for the bread to bow at the middle and burn at this particular point before the entire surface has been properly toasted. We employ a staggered wound resistance element and the turns of this element are relatively close together adjacent the ends of the toaster but are substantially spaced apart adjacent the center of the toaster, thereby insuring uniform heating of the bread throughout its area and eliminating cooling which has heretofore been experienced in toasters by escape of heat by radiation adjacent the ends of the toaster frame.

Our invention will be more clearly understood by referring more particular to the drawings, wherein the support for the toaster frame has been represented by reference character 1. Side members 2 and 4 are secured vertically in the base 1 at opposite ends thereof and are joined at the top thereof by top frame 5. The frame is suitably supported by means of feet 6 on any desired surface. The heating element is contained within the toaster frame by means of upper and lower frame members 7 and 8 which extend longitudinally throughout the distance between frame members 2 and 4. Flat circular depressions 9 are provided in the frame members 7 and 8 with an aperture extending through the frame member within the flattened area. An anchor post is provided at each of the apertures for supporting the heating element in the toaster frame. The anchor post 10 comprises a flat hook 11 which is stamped from the sheet metal of the post with teeth 12 and 14 formed on the end of the post opposite the end bearing the hook. The anchor post has its teeth inserted through slots in a series of flat circular members 15, 16, 17 and 18. The members 16 and 17 are discs of insulating material and fit on either side of the flattened apertured portions 9 in each of the frames 7 and 8. The members 15 and 18 are metallic discs slotted at the center to enable the teeth 12 and 14 of the flat anchor post 10 to pass through the series of washers and remain substantially insulated from the toaster frame members 7 and 8. The teeth 12 and 14 of the anchor post are spaced apart as represented at 19 and so located that shoulders 20 and 21 are provided adjacent the hook end whereby the extremities of the teeth 12 and 14 may be bent against the slotted member 18, drawing the members 15, 16, 17, and 18 together against the flattened apertured portion of the toaster frame and thereby firmly anchoring the post therein. We provide a heat insulating sheet 22 which extends the distance between the vertical frame members 2 and 4 and substantially the width thereof. The heat insulating plate may be formed of asbestos with a top reflecting surface. The plate is apertured at 23 and 24 and is provided with slots 25, 26, and 27 whereby the plate may be inserted over the flat hook assembly with the anchor posts protruding upwardly from the toaster frame member 8. The upper frame member 7 is provided with downwardly depending anchor posts as shown, and between these anchor posts the heating element is arranged. At each end of the lower frame member 8 we provide a short annular member 28 through which the wire 29 comprising the heating element passes. The annular member 28 is positioned within one of the flat apertured portions 9 in the frame 8 by means of insulated discs 30 positioned on either side of the flattened portion 9 serving to space and insulate the annular member 28 from the frame 8 and at the same time rigidly anchoring the annular member in position.

The heating element in our toaster construction is arranged in such manner that a plurality of different spacings between the turns of the heating element is secured. The turns of the wire 29 in coils 31 and 32 are wound closely together. The turns in coils 33 and 34 are more widely spaced than the turns in the coils 31 and 32, while the turns in coils 35 are spaced more widely apart than the turns in the coils 33 and 34. The object of this arrangement is to compensate for the action of the toast when subjected to heat. We have observed that the bread tends to bow out in the middle during the toasting process which normally results in a burn at this particular point. In our method of winding the resistance element the heat is distributed uniformly over the surface of the bread and compensates for the tendency which normally exists for heat to escape by radiation at the ends of the toaster.

Fig. 7 shows more clearly the temperature gradient curve 36 heretofore obtained in toasters and the uniform temperature gradient 37 which we obtain in our toaster construction.

We provide turnover toaster racks 38 and 39 on opposite sides of the heating element. These racks are pivotally mounted by a single connection with the toaster frame. This connection comprises a sheet pressed link 40 having side members 41 and 42 at opposite extremities. The side members 41 are apertured and a shaft member 43 passed therethrough and rigidly fixed in an upper corner of the frame members 2 and 4 immediately below the top frame 5. The side members 42 are apertured to provide a bearing for a shaft 44 which supports the bread rack. A handle 45 is secured to the shaft member 44 and arranged so that by rotating the handle the bread rack is turned over. The power is supplied to the heating element of the toaster through a suitable adapter which connects the plug members 46.

In the operation of the toaster the heating element is raised to the required temperature and the heat continually reflected upwardly by means of plate 22. The heat is uniformly distributed over the area of the bread to be toasted as heretofore explained in connection with the characteristic curve 37. The bread is carried in each of the toaster racks and when one side of the bread has been toasted to the desired degree the knob may be grasped and the link moved outwardly to the dotted line position represented by 45' at the same time that the bread rack 39 is rotated to a position represented by 39'. At this point the action of gravity is brought into effect at 47 to bring the bread rack to a reversed position adjacent the heating element. This process may be repeated a sufficient number of times to complete the toasting of the bread.

While we have described our invention in a certain particular embodiment, it will be understood that various modifications may be made: For example, we may interpose a spring to positively operate the bread rack in lieu of gravity action which is utilized to reverse the bread during the toasting process. We may also pivot the links which carry the bread racks at a point adjacent the lower extremity of the vertical frame members, or they may be pivoted upon the top or bottom members or upon a combination of a vertical frame member and the top or bottom member. It is to be understood that other changes within the scope of the appended claims may be made without departing from the spirit of our invention.

What we claim and desire to secure by Letters Patent of the United States is as follows:

1. An electric toaster, comprising in combination a base member, a pair of vertical frame members, a top member joining the extremities of said vertical frame members, a heating element disposed between said vertical frame members, a bread rack disposed on either side of said heating element, each of said bread racks having a single extended arm connection only with an extremity of one of said vertical frame members.

2. An electric toaster, comprising in combination a base member, a pair of vertical frame members carried by said base member, a top frame member connecting the upper extremities of said vertical frame members, a heating element disposed between said top and base members and said vertical frame members, a bread rack disposed on either side of said heating element, each of said bread racks being provided with a single extended arm pivotal connection between a central section of the bread rack and an extremity of one of said vertical frame members whereby said bread racks may be rotated through 360° for presenting both sides of said bread racks to said heating element.

3. An electric toaster, comprising in combination a base member, a pair of vertical frame members carried by said base member, a top frame member connecting the upper extremities of said vertical frame members, a heating element disposed between said top and base members and said vertical frame members, a bread rack disposed on either side of said heating element, a link pivotally connected at an extremity of each of said vertical frame members and adapted to extend on one side only of said bread racks, a shaft connected with each of said bread racks and journaled in each of said links, and means for rotating each of said shafts whereby said bread racks may be turned over for presenting both surfaces to said heating element.

4. An electric toaster, comprising in combination a base member, a pair of vertical frame members, a top member joining the extremities of said vertical frame members, a heating element disposed between said vertical frame members, a bread rack disposed on either side of said heating element, a single extended link pivotally connected at a corner on a single side only of each of said vertical frame members and arranged to swing through an arc of substantially 90°; a bearing carried on the extremity of each of said links, a shaft journaled in said bearing and connected to one of said bread racks, and means for manually moving said bread racks from a position adjacent said heating element to a position where gravity action forces said racks to assume a reverse position with respect to said heating element.

5. An electric toaster, comprising in combination a base member, a pair of vertical frame members carried by said base member, a top frame member connecting the upper extremities of said vertical frame members, a heating element disposed between said top and base members and said vertical frame members, a bread rack disposed on either side of said heating element, each of said bread racks being provided with a pivotal connection between one end of each bread rack and an extremity of one of said vertical frame members at diagonally disposed points thereof whereby said bread racks may be moved away from said heating element and rotated through 360° for presenting both sides of each bread rack to said heating element.

6. An electric toaster, comprising in combination a base member, a pair of vertical frame members, a top member joining the extremities of said vertical frame members, a heating element disposed between said vertical frame members, a bread rack disposed on either side of said heating element, a pair of channel shaped links having integral side portions at each end thereof, bearings in said side portions, a pivot post in a corner of each of said vertical frame members, a pivotal connection between one end of said links and said pivot posts, a shaft journaled in said bearings at the end of said link opposite said pivoted end, a connection between said shafts and said bread racks whereby said racks may be independently reversed with respect to said heating element.

7. An electric toaster, comprising in combination a base member, a pair of vertical frame members, a top member joining the extremities of said vertical frame members, a heating element disposed between said vertical frame members, a bread rack disposed on either side of said heating element, said heating element comprising a spiral resistor supported in staggered formation with the turns of wire in the spirals adjacent the middle of the toaster more widely spaced than the turns of wire in the spirals adjacent the ends of the toaster whereby a uniform temperature gradient throughout the toasting zone is maintained.

8. An electric toaster, comprising in combination a frame consisting of a base member, a pair of uprights, a top member joining the extremities of said uprights, a heating element disposed within said frame between said uprights, a bread rack disposed on either side of said heating element, each of said bread racks having a single connection only with a point on said frame positioned adjacent said top member.

ANTHONY F. CIBS.
ROBERT P. SIMMONS.